United States Patent [19]
Bush et al.

[11] 3,898,101
[45] Aug. 5, 1975

[54] THERMAL BATTERY
[75] Inventors: Donald M. Bush, Tijeras; Donald A. Nissen, Albuquerque, both of N. Mex.
[73] Assignee: The United States of America as represented by the United States Energy Research and Development Administration, Washington, D.C.
[22] Filed: May 30, 1974
[21] Appl. No.: 474,555

[52] U.S. Cl. ............................ 136/83 T; 136/100 R
[51] Int. Cl. ............................................ H01m 21/14
[58] Field of Search ............ 136/83 T, 83 R, 100 R, 136/20, 6 LF, 6 R, 137, 153, 112, 90

[56] References Cited
UNITED STATES PATENTS
3,527,615  9/1970  Clark et al. ........................ 136/83 T
3,669,748  6/1972  McCullough et al. .............. 136/83 T
3,677,822  7/1972  Bush .................................. 136/83 T Primary Examiner—Anthony Skapars
Attorney, Agent, or Firm—Dean E. Carlson; Dudley W. King; Richard E. Constant

[57] ABSTRACT

An improved thermal battery and method of making same of the type which includes an electrically conductive heat generating disc positioned within each electrochemical cell, a calcium anode, a depolarizer-binder-electrolyte (DEB) mixture pellet, and a calcium hydroxide coating on said anode.

6 Claims, 3 Drawing Figures

THERMAL BATTERY

BACKGROUND OF INVENTION

A thermal battery generally includes a normally solid fusible electrolyte in each of its electrochemical cells which is heated by some appropriate means to fuse the electrolyte and thus activate the cells and battery. The battery will continue to operate so long as its temperature is maintained above the melting point of the electrolyte, until chemicals are used up in the electrochemical process which produces the electricity, or until some failure mechanism occurs which prevents or degrades further battery operation. Most generally, the uncontrollable limiting factor in thermal battery life is in the latter mechanism.

A typical thermal battery may be such as is described in U.S. Pat. No. 3,677,822 to Donald M. Bush and dated July 18, 1972. This battery will generally operate for some desired time period before the battery output decreases or terminates. It has been found that these batteries may fail due to small quantities or drops of molten conductive material forming about the outer edges of the cell which may accumulate sufficiently to cause a bridging or shorting of cell electrodes. These drops are often a calcium-lithium compound or alloy which is formed at the interface between the anode and the electrolyte pellet of each battery cell. The anode in these batteries is generally formed from calcium while the electrolyte pellet is formed from a three-component mixture of a depolarizer (for example calcium chromate), an electrolyte (for example a fused mixture of potassium chloride and lithium chloride in a eutectic composition) and a binder (for example silicon dioxide). The molten calcium-lithium alloy is believed to be the actual active anode of the electrochemical cell system. Since the cells and the cell parts are pressed together and generally maintained under pressure so as to insure good electrical contact between the cell elements during operation, the molten alloy when formed and molten electrolyte may tend to move due to inherent variations in internal cell stack forces or to shock and vibration forces and may eventually reach the edges or periphery of the cells where the alloy may form or accumulate. When sufficient alloy accumulates at the edge of a cell, the cell may be shorted and cause battery failure or degradation of battery operation. This shorting or noise generation may often occur within the first few minutes after activation of the thermal battery, and generally in less than five minutes.

Attempts have been made to overcome these problems by positioning insulators about the edges of the cell stack elements, by providing gaps or spaces about the edges for accumulation of the alloy without bridging electrodes and by modifications to the electrochemical system to suppress formation of the alloy. These attempts may tend to decrease the efficiency of the electrochemical system or its capability to produce electricity, may only be partially successful in preventing this bridging, may produce reaction products which limit effective battery usage, or may substantially add to cost of manufacture. Typical batteries which include one or more of these modifications to minimize these shortcomings are described in U.S. Pat. No. 3,527,615 to R. P. Clark et al. for "Thermal Battery Having Protectively Coated Calcium Anode to Prevent Alloy Shorting," issued Sept. 8, 1970, and in the copending U.S. Application Ser. No. 351,926 to A. R. Baldwin et al. for "An Improved Thermal Battery," filed Apr. 17, 1973. In the Clark, et al. battery, most of the coatings utilized produced gaseous reaction products when heated to the operating temperature of the battery. Production of a gas in the confined space inside a thermal battery, coupled with the elevated operating temperature of these batteries often produce excessive pressures within the batteries limiting their potential usage. If the coatings in Clark were treated in such a manner as to reduce the gas production, the coating which resulted may be very fragile and liable to flake off the surface of the calcium when handled resulting in difficulties in battery manufacture.

SUMMARY OF INVENTION

In view of the above, it is an object of this invention to provide a new and improved thermal battery which may minimize the formation of molten materials about the edges of the battery cells and which provides longer cell and battery operation, without producing deleterious products during battery operation.

It is a further object of this invention to provide such an improved thermal battery without substantial modification to existing thermal battery arrangements.

Various other objects and advantages will appear from the following description of the invention, and the most novel features will be particularly pointed out hereinafter in connection with the appended claims. It will be understood that various changes in the details, materials and arrangements of the parts, which are herein described and illustrated in order to explain the nature of the invention, may be made by those skilled in the art.

The invention comprises a thermal battery and method of making same which utilizes a calcium anode with a DEB pellet and a heat generating disc as part of each cell and includes calcium hydroxide coating on the anode between the anode and DEB pellet.

DESCRIPTION OF DRAWING

The invention is illustrated in the accompanying drawing wherein.

DETAILED DESCRIPTION

Figure 1:
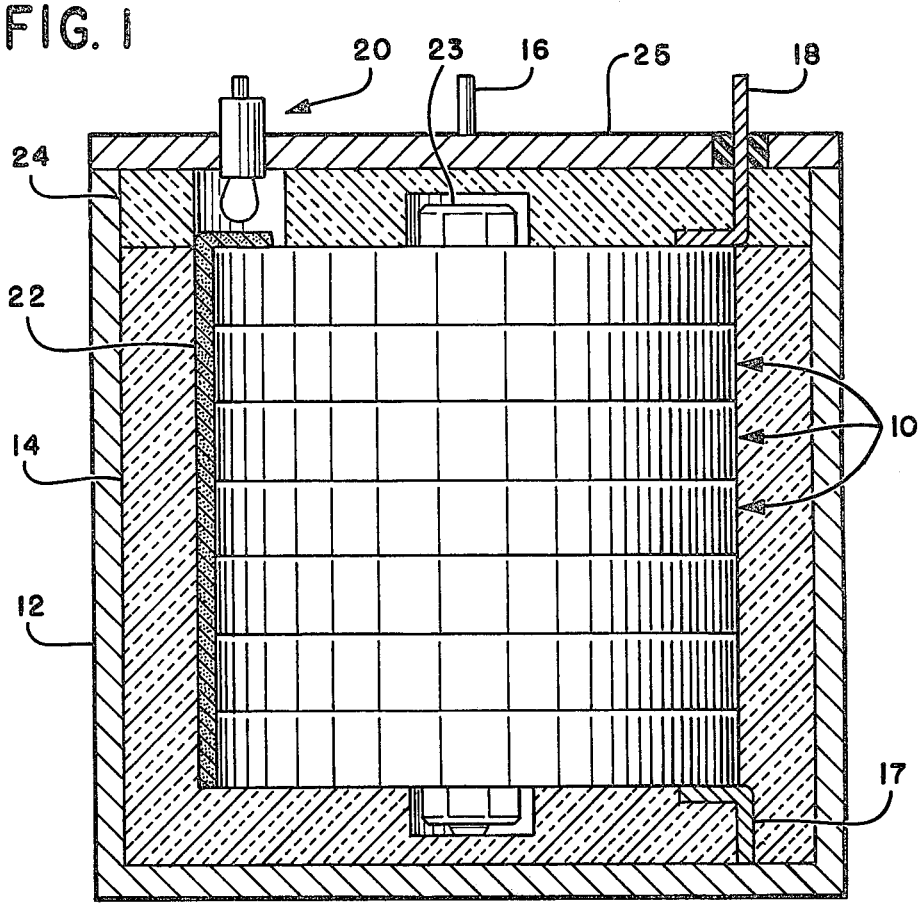
FIG. 1 is a partially cross sectioned view of a thermal battery in which this invention may be utilized.

The thermal battery may include a plurality of electrochemical cells 10 stacked one upon the other in electrical series within a suitable casing 12 and thermal insulating barrier 14. Electrical connections may be made in an appropriate manner by suitable electrical leads and terminals 16, 17, and 18 to the respective positive and negative terminals of the upper and lower battery cells in the stack. The heat or thermal generating elements for the battery, which are generally positioned as a part of each battery cell with or without additional heat generating elements at each end of the battery, may be ignited to activate the battery by a suitable electrical match or detonator 20 and heat powder or fuse 22 which is coupled between the match 20 and the heating generating elements in each cell. The battery is normally formed by first stacking the individual cell elements to form separate cells and then the cells stacked together in the form shown in FIG. 1 and emplaced within the casing 12 and insulator 14 under suitable pressure, such as by a compression force applied by a bolt 23 passing through the center of the cells, or other suitable mechanisms. The so stacked battery cells may then be covered with an end insulator 24 and a casing cover 25 in an appropriate manner. The battery is operated by initiating the electrical match 20 and in turn the heat powder 22 and the individual heat generating elements of the cell stack and the electrical current drawn off through leads 16, 17, and 18.

Figure 2:
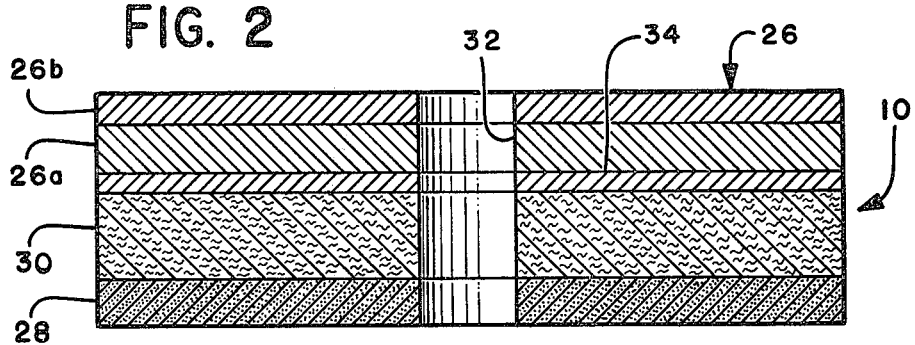
FIG. 2 is a cross-sectional view of a battery cell which may be utilized in the battery of FIG. 1 and which may incorporate features of this invention.

The individual cells, in accordance with this invention and as shown in FIG. 2, may include an anode electrode 26 and a heat generating disc 28 separated by a DEB pellet 30. Each of the discs or pellets is formed in a generally circular or annular shape of similar or the same diameters and may be provided with a central opening or bore 32 for receipt of the battery cell compression mechanism. The individual cell 10 elements are stacked in the manner shown to provide a sandwich of the anode electrode 26, DEB pellet 30 and heat generating disc 28. The anode 26 may be formed of calcium as a bimetal disc, such as a layer 26a on a supporting conductive disc or plate 26b, and includes a calcium hydroxide layer 34 disposed on the anode 26 adjacent to the DEB pellet 30. The DEB pellet 30 may be formed from a mixture of a depolarizer and binder with a normally solid fusible electrolyte which becomes conductive upon being heated to above its melting point. For example, the electrolyte may be a eutectic mixture of potassium chloride and lithium chloride. The depolarizer may be calcium chromate while the binder may be a finely divided silica having a surface area of about 390 square meters/gram. The DEB is normally mixed at a weight percent (w/o) ratio of 37/56/7 with the electrolyte of a eutectic mixture of about 45/55 w/o lithium chloride/potassium chloride. The heat generating disc 28 may be formed from such as iron-potassium perchlorate or the like which, when ignited, is electrically conductive and produces a minimum of gas or other deleterious products. The heat pellet may be an 88/12 w/o mixture of iron and potassium perchlorate which may exhibit a calorific output of about 222 calories per gram.

It has been found that treating of the calcium anode to provide a calcium hydroxide coating 34 over the anode surface which faces DEB pellet 30 effects a reduction in the amount of alloy produced around the periphery of the cells when the calcium hydroxide coating 34 is at a thickness of from about 0.01 to about 0.1 millimeters. The coating 34 may be applied to anode 26 by exposing the anode to a stream of either air or argon which has been thoroughly saturated with water vapor (for example, partial pressure of water vapor of about 25 millimeters of mercury) for approximately four hours at room temperature. The longer the treatment period, the more coating that may be produced. The treatment should be continued for a period of at least 2 hours and up to about 10 hours. The amount of calcium hydroxide coating produced may be determined by monitoring the weight gain of the anode. The desired amount of coating of this invention is about 1.0 to about 3 milligrams/square centimeter at current densities of about 60 milliamps/square centimeter and above. Somewhat thicker coatings may be desirable at lower current densities. Where thicker coatings are used, it may be desirable to increase the thickness of the initial calcium layer to provide sufficient material for reaction in the cell structure.

Cells were prepared without coating 34 and with a coating in which the anodes were exposed to water vapor for varying periods of time and then the coated and uncoated anodes assembled into cells and the cells discharged at about 60 milliamps/square centimeter. The calcium layer 26a in each anode was initially .25 millimeters thick in each cell. The results are indicated in the following table:

| Anode Weight Gain (mg/cm²) | Oxidation Time (hrs) | Short/ Total | Peak Voltage (V) | Activated Life to 2.0V (min.) | Alloy Weight (mg) |
| --- | --- | --- | --- | --- | --- |
| None | 0 | 5/12 | 2.62 | 16.9 | 36 |
| 0.30 | 1 | 2/3 | 2.63 | 15.7 | 25 |
| 1.02 | 2 | 1/6 | 2.64 | 16.1 | 18 |
| 3.18 | 4 | 0/3 | 2.64 | 15.8 | 7 |
| 8.0 | 8 | 0/3 | 2.64 | 6.0 | 2.5 |

As is indicated in the table, those cells which included an anode weight gain of greater than about 1 milligram/square centimeter produced significantly lower amounts of alloy and significantly lower rates of cell shortings than the other cells at this rate of discharge and may as a result exhibit longer useful cell lifetimes over the untreated cells. It is noted, that the treatment of the anodes reduced the available calcium for electrochemical reaction in treated cells which tended to reduce lifetimes of treated cells.

Figure 3:
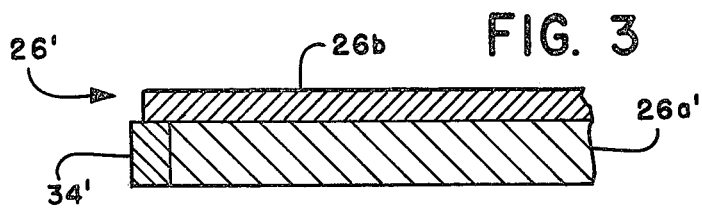
FIG. 3 is a fragmentary, cross-sectional view of another embodiment of this invention.

It has also been found that useful cell lifetimes may be extended by treating only the edge of the anode, as shown in FIG. 3, to provide a coating 34' of calcium hydroxide around the periphery of the calcium layer 26a' of anode 26'. In order to produce coating 34', an untreated anode may be clamped between two plates so that only edge portions of the anode are exposed. The clamped anode edges may then be treated in the same manner as described above with respect to anode 26 and coating 34 to produce coating 34' with the desired thickness of calcium hydroxide. The coating 34' minimizes or inhibits production of calcium lithium alloy at the cell periphery. Cells using anodes with a peripheral coating 34' were compared with anodes without any treatment using calcium anode thickness one half of that above. The cells which included a peripheral coating 34' prepared by oxidation for about 4 hours produced about 4 milligrams of alloy at the end of activated life compared to about 17 milligrams for the untreated cells. It is understood, that the calcium hydroxide coating may cover all exposed areas of the calcium portion of the anode, if desired, around both the periphery and surface adjacent to the DEB pellet.

The coatings 34 and 34' remained intact during normal handling of the anodes and assembly of the cells and batteries. The coatings are an integral part of the anode being a reaction product thereof and exhibited good adherence.

What is claimed is:

1. A long-life thermal battery comprising a casing; a plurality of electrochemical cells in said casing, each cell including an anode disc having a calcium portion, an electrically conductive heat generating disc, and a normally solid fusible electrolyte disc sandwiched between the calcium portion of said anode and said heat generating discs, said electrolyte disc including a mixture of a calcium chromate depolarizer, a silicon dioxide binder, a eutectic composition of potassium chloride and lithium chloride, and said anode including a calcium hydroxide coating disposed over surfaces of the calcium portion of said anode; and means for igniting said heat generating discs.

2. The thermal battery of claim 1 wherein said coating is from about 0.01 to 0.1 millimeter thick.

3. The thermal battery of claim 1 wherein said coating is over the surface of the calcium portion which is adjacent to said electrolyte disc.

4. The thermal battery of claim 1 wherein said coating is over peripheral surfaces of the calcium portion of said anode.

5. A method for preparing a calcium anode for thermal batteries comprising subjecting exposed surfaces of the calcium anode to a water vapor saturated oxidizing atmosphere for from about 2 to about 10 hours.

6. The method of claim 5 which includes first covering a portion of the calcium anode surface leaving only peripheral portions exposed.

* * * * *